United States Patent [19]

Francis, Jr. et al.

[11] Patent Number: 4,828,132

[45] Date of Patent: May 9, 1989

[54] COLLAPSIBLE REUSABLE CONTAINERS, WALL SLEEVES AND HINGES THEREFOR

[75] Inventors: Philip S. Francis, Jr., Clewiston, Fla.; Stephen J. Harris, Pasadena, Md.; Raymond H. Gosnell, Plymouth, Mich.

[73] Assignee: United States Corrulite Corporation, Clewiston, Fla.

[21] Appl. No.: 78,908

[22] Filed: Jul. 28, 1987

[51] Int. Cl.⁴ ............................................. B32B 27/00
[52] U.S. Cl. ....................................... 220/6; 220/4 F; 220/1.5; 16/225
[58] Field of Search .................. 220/6, 4 F, 1.5, 76, 220/80, 338; 217/43 A; 16/225

[56] References Cited

U.S. PATENT DOCUMENTS

| | | | |
|---|---|---|---|
| 3,441,975 | 5/1969 | Shepherd | 16/225 |
| 3,989,157 | 11/1976 | Veenema | 220/80 X |
| 4,344,475 | 8/1982 | Frey | 16/225 X |
| 4,643,314 | 2/1987 | Kidd | 220/6 X |
| 4,660,724 | 4/1987 | Gaynes | 220/1.5 X |
| 4,670,938 | 6/1987 | Fowlston | 220/339 X |
| 4,673,087 | 6/1987 | Webb | 220/4 F X |

Primary Examiner—Steven M. Pollard
Attorney, Agent, or Firm—Perman & Green

[57] ABSTRACT

A reusable, collapsible, rectangular hinged container comprising a novel foldable wall section or sleeve having strong, rigid weather-resistant wall panels and a pair of strong rigid, weather resistant top and bottom cap members, each of which overlaps with and supports a marginal area of the open wall section or sleeve to form the container. The wall section or sleeve contains a plurality of novel strong, rigid, panel-supporting hinge members which enable the sleeve to be folded to a flat condition in which it is completely receivable within and between the cap members to provide a compacted container to be returned to a supplier for reuse.

15 Claims, 3 Drawing Sheets

COLLAPSIBLE REUSABLE CONTAINERS, WALL SLEEVES AND HINGES THEREFOR

BACKGROUND OF THE INVENTION

The present invention relates to novel reusable relatively large shipping containers which are strong and weather resistant, for the shipping of products by a supplier to a customer, and to wall sleeves for such containing which are capable of being folded into compact size for shipment back to the supplier for reuse, and to novel brace and hinge members for use thereon.

It is desirable for reasons of economy and conservation to be able to reuse large, relatively expensive bulk shipping containers. Moreover some companies require the use of reusable containers by suppliers in order to reduce cost, and also to avoid the problems of disposing of conventional shipping containers designed for single use.

Most shipping containers are made from corrugated paper board or cardboard, which is not sufficiently strong or weather resistant to render it practical for reuse, especially in the case of large containers designed to contain heavyweight materials and requiring mechanical lifting assistance such as by use of supporting wooden pallets and fork-lifting equipment. Reference is made in U.S. Pat. No. 4,392,606 which discloses collapsible bulk containers comprising a cardboard sleeve section formed by wrapping two superposed lengths of cardboard around each other and prebanding the sleeve section with banding material, the sleeve section being capable of being folded flat and also being unfolded to squared condition for assembly with top and bottom cap members to form the container adapted to be supported on a pallet or other surface. Such bulk containers are not made for reuse, do not have integral hinge members or brace members and thus require bulge-resistant peripheral strapping, and do not have end walls which are foldable inwardly between the side walls to a compact size which fits within the cap members to provide a collapsed container which requires a minimum of space for storage or shipping.

Some shipping containers are made from wood, which may be durable and weather resistant. However such containers are bulky and heavy, so as to be expensive to ship back to the supplier. Also, wooden containers generally are nailed together and therefore may be difficult to open without damaging the wood and destroying the reusability of the container. Also, wood is relatively brittle and susceptible to cracking during shipment, lifting, discharge of contents, etc.

It is known to use rigid metal and plastic shipping containers which avoid many of the difficulties inherent in the use of other construction materials such as cardboard and wood. The main problem with such shipping containers is their bulk, which presents an expense and a storage problem for both the customer and the supplier. Empty rigid shipping containers require as much room as filled containers during storage and also during shipping.

SUMMARY OF THE INVENTION

The present invention relates to assemblies for providing collapsible rigid shipping containers which are durable, weather resistant, light weight and easy to use and reuse, and which are foldable in simple manner into a compact size requiring a minimum of storage and shipment space. The present invention also relates to novel composite brace and hinge means which enable the assembly of rigid wall panels into a foldable, unitary wall section or wall sleeve designed to be folded to a compact size having a length and height no greater than that of one of the side panels and a thickness no greater than a few inches, enabling the folded wall section to be placed within the rigid top and bottom caps of the container for storage and/or reshipment to the supplier in compact condition.

More specifically, the present containers comprise similar top and bottom cap members molded from durable plastic composition, preferably having integral stand-off legs providing pallet capability, and a foldable wall section or sleeve which opens to a rectangular shape which is open at the top and bottom for reception a short distance within the cap members. The foldable wall section or sleeve consists of two elongate outer side panels and four narrow outer end panels of rigid material, such as corrugated plastic board. Each rigid panel is connected along its entire edge to the adjacent edge of the next panel by means of an elongate composite brace and hinge member which supports the panel edges against bowing and yet provides a flexible hinge which enables the end walls to be folded inwardly, between the elongate side walls, to form a flat compact folded assembly. The folded assembly can be laid flat within and between the end caps which can be fastened together to form a thin or narrow collapsed container requiring a minimum of storage and shipment space.

DESCRIPTION OF THE DRAWINGS

Referring to FIG. 1, the collapsible container assembly 10 thereof comprises a foldable wall section or sleeve 11 and a pair of rigid cap members 12 and 13, each having a narrow peripheral wall or lip, 12a and 13a respectively, which extends over the open ends of the wall section or sleeve 11 to form a retainer therefor. The wall section or sleeve 11 comprises a rectangular assembly of two rectangular elongate outer side panels 14 and 15 of rigid, durable construction material, such as corrugated plastic board, and four rectangular narrow outer end panels 16, 17, 18 and 19 of similar construction material, two such panels at each end of the sleeve 11, as illustrated more clearly in FIG. 2.

Figure 3:
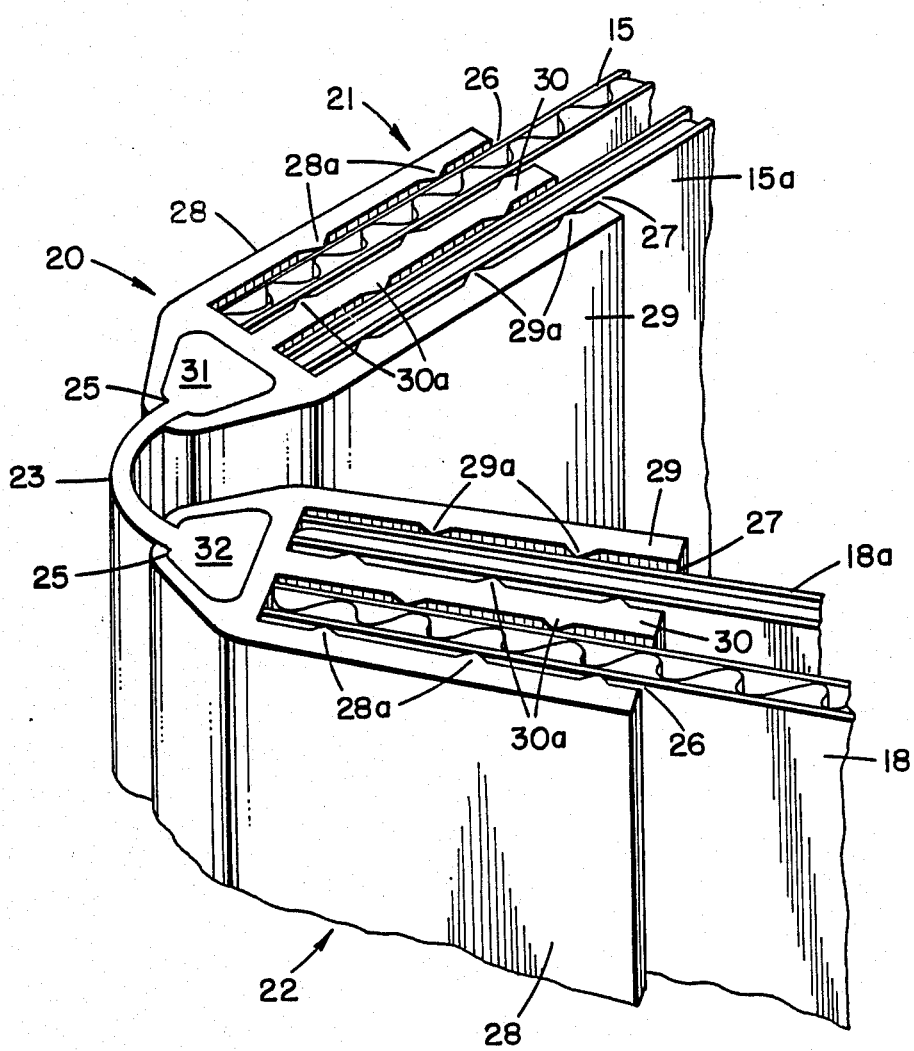
FIG. 3 is a perspective end view, to an enlarged scale, of a corner section of the sleeve of FIG. 2 illustrating the composite structure of the novel extruded brace and hinge member according to one embodiment of the present invention.

Each of the panels of the sleeve 11 is connected along its entire height edges to the height edges of the adjacent panels by means of novel elongate composite brace and hinge members 20 having opposed rigid brace portions 21 and 22 united by means of a continuous flexible integral hinge portion 23, as shown most clearly by FIG. 3.

In the illustrated embodiment, the container 10 has a double walled sleeve 11 including corresponding inner side and end panels 14a, 15a, 16a, 17a, 18a and 19a having the same dimensions as the corresponding outer panels, and the brace and hinge members 20 are formed with brace portions 21 and 22 each having a parallel pair of edge receiving inner and outer slots, 24 and 25 for brace portion 21 and 26 and 27 for brace portion 22. Also, in the illustrated embodiment, all of the rigid durable panels comprise corrugated plastic board. However, the panels are formed and oriented so that the corrugations in each pair of parallel outer and inner panels, i.e. 14 and 14a, 15 and 15a, 16 and 16a, 17 and 17a, etc, extend at right angles relative to each other, as shown most clearly in FIG. 3. This is advantageous in cases where the panel material has different flexibility properties along its length and its width. Corrugated plastic board is more resistant to bending in a direction transverse or across the direction of its corrugations than in a direction parallel to or along the direction of its corrugations. Thus, in the double wall construction of the drawings the outer wall panels are oriented with the corrugations extending in the height direction, for resistance against the walls bowing in directions along the width and length of the container, and the inner wall panels are oriented with the corrugations extending in the length or width direction, for resistance against the walls bowing in a direction along the height of the container.

Figure 1:
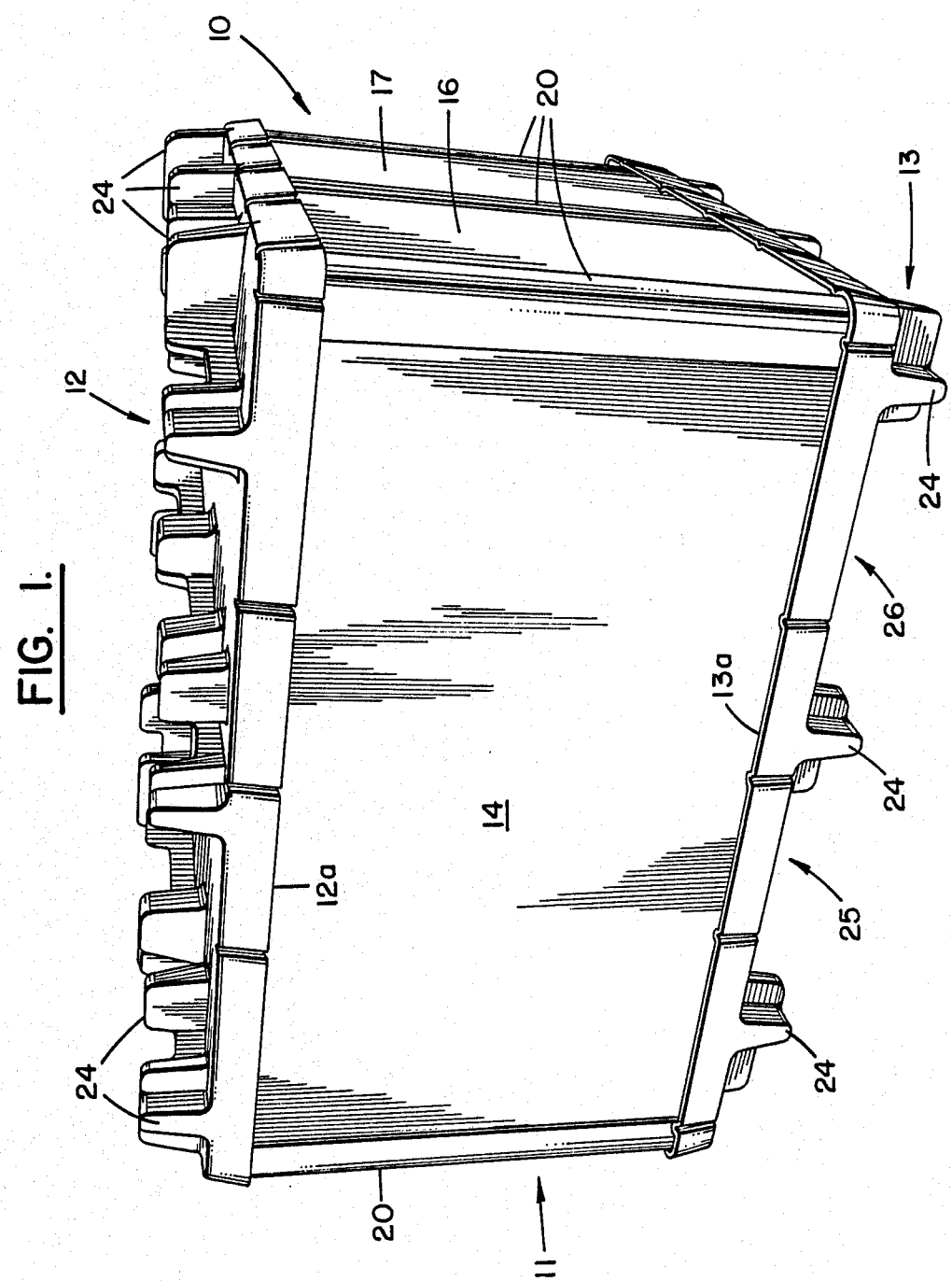
FIG. 1 is a perspective view of a collapsible, reusable container according to the present invention.

The cap members 12 and 13 illustrated in FIG. 1 are similar rectangular plastic caps or covers which are molded from durable, weather resistant high impact strength composition, such ascrylonitrile butadiene styrene (ABS) molding composition, and are molded to have a plurality of integral spaced stand-off blunt legs 24 and a depending peripheral wall portion or lips, 12a and 13a. The legs 24 are aligned to provide therebetween a pair of parallel spaces 25 and 26 for admitting the fork of a fork-lift truck, whereby the lower cap member 13 functions as a pallet. The depending lips 12a and 13a each form a rectangular interior recess having an inner periphery slightly larger than the outer periphery of the wall sleeve 11 so as to fit over the open ends of the sleeve and restrain the sleeve against expansion. The upper cap member 12 is applied over the wall sleeve 11 after the container has been filled, and fastening straps can be applied around the container to secure the assembly during stacking, storing, shipping, etc.

The wall sleeve 11 is formed by providing a plurality of thin, flat panels of rigid, weather resistant construction material such as plywood, aluminum, plastic, or the like. The preferred construction material is doublefaced corrugated plastic board available under the trademark "Corrulite" from U.S. Corrulite Corp., Clewiston, Fla. Reference is made to U.S. Pat. Nos. 3,837,973 and 3,999,928 for their disclosure of such materials. The rectangular panels are cut to the required dimensions, depending upon the dimensions of the cap members 12 and 13. The elongate side panels 14, 14a, 15 and 15a most preferably have a length, including the assembled end members 20, slightly less than the inner length of the side portions of caps 12 and 13, between opposed lips 12a and 13a and a height which is slightly less than the inner length of the end portions of caps 12 and 13, between opposed lips 12a and 13a, thereby permitting the folded wall sleeve 11 to be laid flat within the interior recess of the cap members 12 and 13, within the confines of lips 12a and 13a which are adjacent each other when the container is reassembled in collapsed condition.

Figure 2:
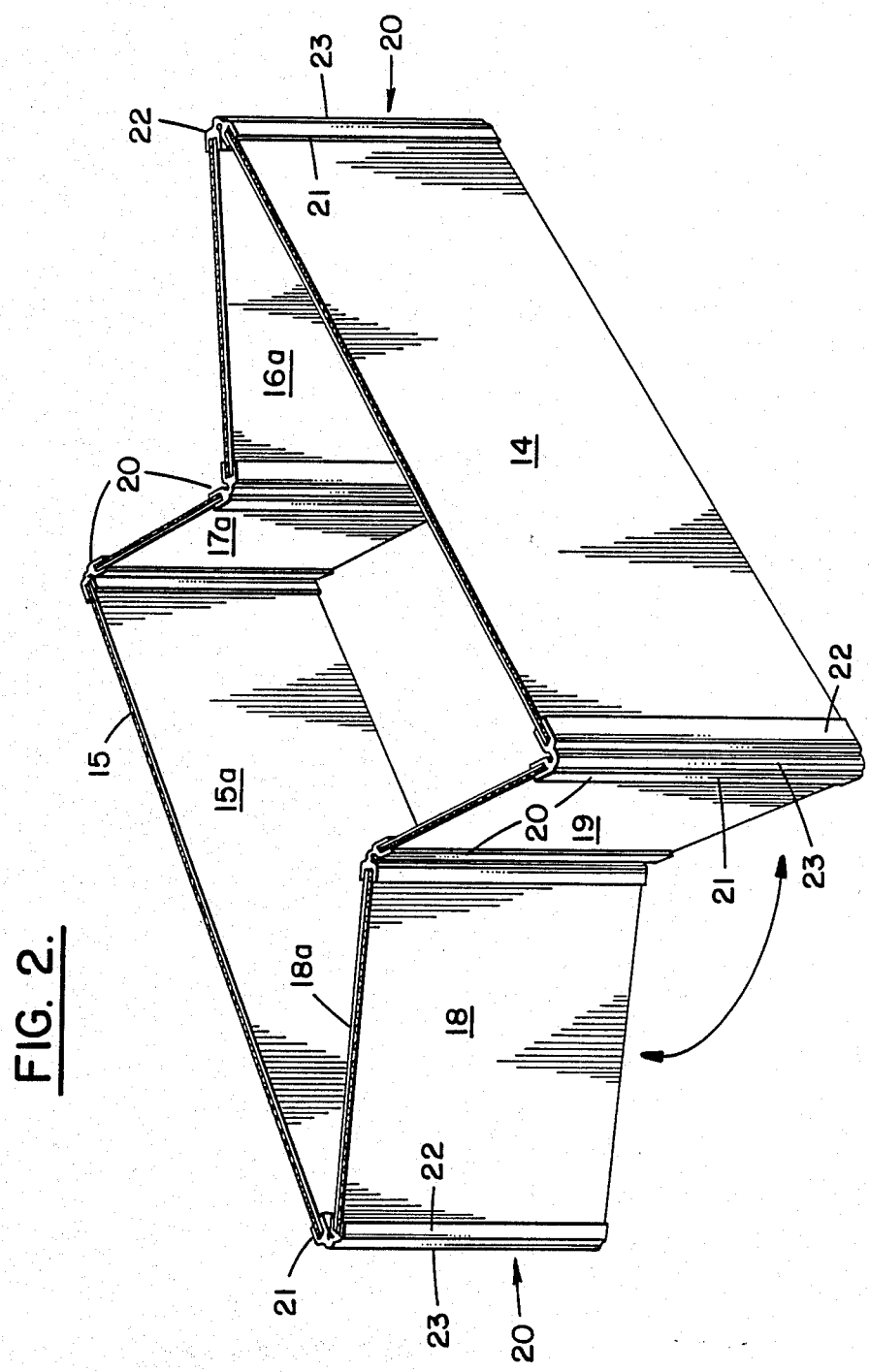
FIG. 2 is a perspecting view of the foldable wall section or sleeve according to an embodiment of the present invention, illustrating the end walls in the process of being folded inwardly between the elongate side walls.

The narrow end panels 16 to 19 and 16a to 19a each have the same height as the side panels 14 and 15 but have widths equal to less than one-half the width of the side panels 14 and 15. Thus, when the end pairs of panels, such as 16-17 and 18-19 are assembled with a connecting central hinge member 20 and with connecting corner hinge members 20, and the ends of the wall sleeve 11 are drawn towards each other as shown by FIG. 2, when the sleeve 11 is folded to flat condition, the central hinge members 20 of the opposed end walls should not overlap since this will increase the thickness of the folded sleeve member.

The novel integral brace and hinge members 20 of the present invention preferably are extended as elongate, rods or strips comprising strong, relatively flat rigid brace sections 21 and 22, such as of unplasticized polyvinyl chloride resins having a high durometer hardness or similar hard, strong, crack-resistant resinous molding composition, and a strong, rubbery or flexible central hinge section 23, such as of plasticized polyvinyl chloride having a low durometer hardness or other natural or synthetic rubber-like composition, which is integrated physically with the brace sections 21 and 22 to prevent separation of the sections under the stress of use. Most preferably the brace sections 21 and 22 are extruded as a single continuous length so as to have an elongate hinge retainer slot 25 along one edge thereof, slot 25 being wider inwardly from its mouth, and to have a single or, as illustrated, a pair of parallel elongate panel engaging slots 26 and 27 formed to a depth of about one inch or more between outer and inner grip flanges 28 and 29 and a central grip wall 30. The flanges 28 and 29 and the central wall 30 preferably are extruded to have spaced elongate integral projecting ribs 28a, 29a and 30a, as shown in FIG. 3, in cases where the panels to be engaged within the slots 26 and 27 have some degree of surface flexibility, such as is true of corrugated plastic board. Preferably the ribs are offset relative to the ribs present on the opposed walls of each slot.

The integral brace and hinge members 20 are then formed by cutting the continuous length of brace extrusion into long lengths 21 and 22 which are mounted in close association with the flat orifice of a rubber extrusion machine, the brace members being supported with their hinge retaining slots 25 facing and parallel to each other to form side portions of an elongate, flat extrusion cavity into which a continuous length of strong, flexible rubbery molding composition is extruded, either the brace members or the extrusion head being moved to produce a continuous length of brace and hinge member 20 upon cooling and solidification of the rubbery molding composition, which preferably comprises plasticized polyvingl chloride resin or the like. The solidified hinge portion 23 forms elongate edge beads 31 and 32 which are retained within the hinge retainer slots 25 because of the narrow mouth of the slots 25, to form a strong composite structure having rigid brace portions 21 and 22 and a flexible hinge section 23. The elongate member 20 is then cut, as needed, into desired lengths corresponding to the height of the wall sleeves 11 being formed.

The wall sleeve 11 is formed by sliding the height edges of the inner and outer panels into an open end of the slot 26 and 27 of the brace sections 21 and 22 and moving the hinge and brace member 20 and its inner ribs along the length of each panel edge until the panel edge fills the slot 26 or 27 to form the sleeve 11 aaving opposed double wall elongate sides comprising side panels 14, 14a and 15, 15a and opposed double wall ends comprising end panels (16, 16a, 17, 17a connected by a central member 20, and 18, 18a, 19, 19a connected by a central member 20). The brace sections 21 and 22 are rigid and flex-resistant, including the flanges 28 and 29 and central wall 30. The slots 26 and 27 are extruded to have a minimum gap or width which is less than the thickness of the wall panels. In the illustrated embodiment the minimum gap or width of slots 26 and 27 is defined by the distance between the height of the peaks of the offset longitudinal ribs 28a, 29a and 30a present along the entire length of the opposed walls forming the slots 26 and 27. The offset positions of the ribs 28a relative to the ribs 30a in slot 26, and of the ribs 29a relative to ribs 30a in slot 27, causes the engaged sides of the panels seated within the slots to be tightly pressed and engaged with forces which tend to distort or flex the engaged panel edges into a zig-zag or serpentine shape which provides high resistance to withdrawal under the pressures of use.

In cases where the composition of the panels is resistant to any surface impression of distortion, or where exceptional strength is required, it is possible to apply spaced rivets or other fastening means through the brace sections 21 and 22 and through the panel edges engaged within the slots 26 and 27 to provide a locking engagement therebetween, the fastening means being spaced from each other along the length of the sections 21 and 22 by a suitable distance, such as twelve inches or more, depending upon the size and utility of the container.

Rigid top and bottom cap members suitable for use in the assembly of the present invention are commercially available from a number of sources, including the pallet-design caps illustrated by FIG. 1 of the present drawing. Thus, the present collapsible wall sleeve members of FIG. 2 of the present drawing can be supplied to end users, such as product-shipping companies, that have the top and bottom caps for assembly therewith to form the containers, or the present containers can be sold in collapsed condition with the top and bottom caps as a total package.

Also it will be clear that the present brace and hinge members are suitable for a variety of other uses, such as where ever a flexible hinge connection is desired between thin flexible panels which require bracing. Thus the present brace and hinge members can be sold as continuous lengths to be cut into hinge members of any desired size.

While preferred embodiments of the invention have been disclosed in detail, it should be understood by those skilled in the art that various modifications may be made to the illustrated embodiments without departing from the scope as described in the specification and defined in the appended claims.

What is claimed is:

1. A collapsible, foldable, double panel tubular wall sleeve for use in providing collapsible, reusable bulk containers having top and bottom cap members, said wall sleeve comprising parallel pairs of inner and outer rectangular flat wall panels constructed of strong, rigid weather-resistant material, said panels including two elongate outer side panels and two elongate inner side panels having similar dimensions, and four narrow outer end panels and four narrow inner end panels, each having the same height as the side panels but having a width less than one-half the width of the side panels, and six elongate brace and hinge members, each having substantially the same heights as said panels and comprising opposed, elongate, rigid brace portions connected by an elongate flexible hinge portion, the brace portions each having a spaced pair of adjacent, parallel, elongate narrow edge-receiving slots, a parallel pair of said narrow outer and inner end panels being connected to another parallel pair of inner and outer end panels to form two connected pairs thereof by engaging the adjacent height edges of each parallel pair of inner and outer end panels within the opposed parallel pairs of edge-receiving slots of a brace and hinge member to form two foldable double panel end walls, each of the other height edges of the four narrow inner and outer end panels being engaged within an inner or outer edge receiving slot of a different brace and hinge member, and the opposed height edges of each of said elongate side panels being engaged within the other inner or outer edge-receiving slots of said different brace and hinge members to form a tubular wall sleeve having opposed elongate double panel side walls and opposed foldable double panel end walls which can be folded towards each other, between said side walls, to form a flat, collapsed assembly.

2. A wall sleeve according to claim 1 in which the slots in each of said brace sections contain a plurality of spaced projections which extend into said slots to narrow the width thereof and provide engagement members which restrain withdrawal of the panel edges engaged therein.

3. A wall sleeve according to claim 1 in which each said opposed brace section comprises a relatively flat extrusion of hard plastic composition having said parallel pair of edge-receiving slot formed inwardly along one side edge thereof to a depth greater than about one inch to provide opposed edge-engaging walls of each said slot, each said extrusion also having an elongate, hinge-connecting, slotted opening formed inwardly along the other side edge thereof within which an edge of said elongate flexible hinge portion is connected.

4. A wall sleeve according to claim 3 in which said hard plastic composition comprises rigid unplasticized polyvinyl chloride resin and said hinge portion comprises rubbery plasticized polyvinyl chloride.

5. A wall sleeve according to claim 1 in which said wall panels comprise double-faced corrugated plastic board.

6. A wall sleeve according to claim 2 in which said wall panels comprise double-faced corrugated plastic board, the corrugations in the parallel panels forming each of the double panel walls being oriented in different directions.

7. A collapsible. reusable bulk container comprising a tubular double panel wall sleeve according to claim 1 and a pair of top and bottom cap members therefor each said cap member having a peripheral wall or lip forming a rectangular recess, the inner periphery of said wall or lip being slightly larger than the outer periphery of the wall sleeve, adjacent the open ends of the wall sleeve, one open end of the wall sleeve being received within the recess of the bottom cap member and the other open end of the sleeve being received with the recess in the top cap member, and the peripheral wall or lip of each cap member extending a distance over the sleeve member to restrain the latter against expansion and provide a closed container.

8. A container according to claim 7 in which the bottom cap member has spaced stand-off legs and serves as a pallet for the container.

9. A container according to claim 7 in which the wall sleeve comprises panels of corrugated plastic board.

10. A brace and hinge member for providing an elongate flexible hinge attachment between parallel pairs of thin, flexible panels, comprising an opposed pair of elongate rigid plastic brace sections united along one side edge of each by an elongate flexible plastic hinge portion, the other side edge of each brace section comprising a parallel pair of inner and outer elongate, narrow slots designed to receive and hold the edges of a parallel pair of thin, flexible panels and restrain the panels against flexing.

11. A brace and hinge member according to claim 10 in which said brace sections comprise extrusions of hard plastic composition having said parallel pair of slots formed inwardly along one side edge thereof to a depth greater than about one inch to provide opposed edge-engaging walls of said slot.

12. A brace and hinge member according to claim 11 in which each of the opposed edge-engaging walls is provided with a plurality of spaced projections which extend into said slot to provide engagement members which restrain withdrawal of panel edges inserted into said slots.

13. A brace and hinge member according to claim 12 in which said hard plastic composition comprises rigid unplasticized polyvinyl chloride resin.

14. A brace and hinge member according to claim 13 in which said elongate flexible hinge portion comprises plasticized polyvinyl chloride resin.

15. A brace and hinge member according to claim 11 in which said extrusions also comprise an elongate hinge-connecting slotted opening formed inwardly along the other side edge thereof, within which an edge of said elongate flexible hinge portion is connected.

* * * * *